United States Patent

Gestermann et al.

[11] Patent Number: 5,693,202
[45] Date of Patent: Dec. 2, 1997

[54] PRESSURE-COMPENSATED ELECTROCHEMICAL CELL

[75] Inventors: Fritz Gestermann, Leverkusen; Hans-Dieter Pinter, Wermelskirchen, both of Germany

[73] Assignee: Bayer Aktiengesellschaft, Leverkusen, Germany

[21] Appl. No.: 567,616

[22] Filed: Dec. 5, 1995

[30] Foreign Application Priority Data

Dec. 12, 1994 [DE] Germany ............... 44 44 114.2

[51] Int. Cl.⁶ .............. C25B 9/00; C25B 11/00; C25B 15/08
[52] U.S. Cl. .............. 204/265; 204/266; 204/277; 204/278; 204/283
[58] Field of Search .............. 204/265, 266, 204/256, 258, 277–278, 283

[56] References Cited

U.S. PATENT DOCUMENTS

| | | | |
|---|---|---|---|
| 3,168,458 | 2/1965 | Sprague | 204/266 X |
| 3,930,151 | 12/1975 | Shibata et al. | 204/266 X |
| 4,142,950 | 3/1979 | Creamer et al. | 204/265 X |
| 4,233,147 | 11/1980 | Giacopelli et al. | 204/266 |
| 4,329,218 | 5/1982 | Sorenson et al. | 204/266 X |
| 4,732,660 | 3/1988 | Plowman et al. | 204/283 X |
| 5,087,344 | 2/1992 | Wenske et al. | 204/266 X |

FOREIGN PATENT DOCUMENTS

| | | |
|---|---|---|
| 248433 | 12/1987 | European Pat. Off. . |
| 599363 | 6/1994 | European Pat. Off. . |
| 8501072 | 3/1985 | WIPO . |

*Primary Examiner*—Donald R. Valentine
*Attorney, Agent, or Firm*—Sprung Kramer Schaefer & Briscoe

[57] ABSTRACT

The invention relates to an electrochemical half-cell consisting in at least one electrode chamber 14 for accommodation an electrolyte, a gas chamber 23 and at least one gas-diffusion electrode 5 as anode or cathode separating gas chamber 23 and electrode chamber 14, in which the gas chamber 23 is divided into two or more gas pockets 20, 20' superimposed on one another after the manner of a cascade, with which the gas supply or gas discharge takes place through openings 11, 12 to the electrolyte 22.

21 Claims, 4 Drawing Sheets

PRESSURE-COMPENSATED ELECTROCHEMICAL CELL

The use of gas-diffusion electrodes in a wide range of electrolytic processes permits alternative reaction paths in many cases or assists in preventing undesirable or uneconomic by-products of an electrolysis. In alkali-halide electrolysis, for example, hydrogen is an undesirable by-product which as a product whose production is unavoidable often cannot be made practical use of. In addition, the energy value of the hydrogen in the electrolytic process is as a rule far higher than the sales price which can normally be obtained for hydrogen. It therefore seems sensible that the hydrogen formed electrochemically as a by-product should be put to further use electrochemically or be prevented completely by means of an alternative course of reaction.

One possibility for the further electrochemical use of the hydrogen is utilization in fuel cells. An interesting method is described in U.S. Pat. No. 4,647,351. It is proposed there that the hydrogen be collected through the coupling of alkaline fuel cells to the electrolytic process. In this case the alkaline solution from the cathode chamber of the electrolysis is introduced into the anode and cathode chambers of the fuel cell, enriched and released in the cathode chamber and depleted in the anode chamber and fed back into the electrolysis. Disadvantageous with this method are the high cost of equipment, the additional energy losses during the hydrogen formation and the subsequent oxidation in the fuel cell, and also the electric line losses and the problems connected with the direct use for the electrolysis of the direct current from the fuel cells, given the mutually opposed current-versus-voltage characteristics.

An alternative method is to prevent hydrogen formation on the electrolysis cathode by oxygen reduction on an oxygen-consuming cathode. In this way, for example during alkali-hydroxide electrolysis—in a very similar way to the conventional procedure with hydrogen formation—hydroxide ions are formed on the cathode, which excite the migration of alkali ions through a cation-selective membrane into the cathode chamber and there lead to the formation of alkali-hydroxide solution. The formation of the target products halogen and alkali-hydroxide solution is not thereby affected, in sharp contrast to the consumption of electric power, which declines sharply. A number of studies have been carried out in the past on oxygen-consuming cathodes in alkali-halide electrolysis. The following general problem has arisen:

The gas-diffusion cathode, in the case of alkali-halide electrolysis operated e.g. as an oxygen-consuming cathode, is an open-cell membrane between electrolyte and gas chamber which is intended to permit the oxygen reduction to take place on the three-phase boundary between electrolyte, catalyst and oxygen as close as possible to the electrolyte. This boundary layer is stabilized due to the hydrophobic properties of the cathode material. It is found, however, that this stabilization, which occurs simply as a result of the surface tension of the electrolyte, permits only a finite pressure drop between gas side and liquid side. If the gas-side pressure is too high, the gas ultimately breaks through the membrane and the function of the electrode is disturbed in this area and the electrolytic process is interrupted. If on the other hand the liquid pressure is too high, the three-phase boundary is pressed out of the catalyst area in the membrane, which likewise interferes with the function of the cathode, and on further pressure increase leads to a liquid penetration of electrolyte into the gas chamber. With a vertical electrode layout—necessary as with membrane electrolyses to enable the target product chlorine to be drawn off satisfactorily—this leads to a restriction of the overall height of the gas-diffusion electrodes, since otherwise gas penetrates into the cathode chamber at the top and liquid penetrates into the gas chamber at the bottom. The technically feasible overall height therefore remains limited to approx. 20 cm, which is unattractive for the membrane electrolyzers currently on the market.

In order to overcome this disadvantage, some proposed methods have been described, none of which has however proved successful. In laid-open print DE 34 01 636 A1, for example, the problem of the hydrostatic pressure is circumvented by the fact that the electrolyte flows between the cation-exchanging membrane and the gas-diffusion electrode in a falling-film apparatus. In this way a largely isobaric state between electrolyte chamber and gas chamber is achieved. Problems in long-term tests (e.g. wetting problems and bubble formation between the membranes) have however led to the abandonment of this method for electrolytical purposes.

In laid-open print DE 34 39 265 A1 a level cell arrangement is proposed for preventing the differential pressure problem, in which the electrolyte flows are directed horizontally. This arrangement has also not proved successful, since on the one hand gas formed in the cell can be led away only with difficulty and on the other a forced flow to renew the electrolyte is scarcely possible with this arrangement.

An alternative proposal more complex in technical terms is disclosed in U.S. Pat. No. 4,657,651. Here the pressure equalization is achieved by the fact that the cathode is divided into, individual horizontal chambers which are loaded individually with gas, wherein the gas pressure resulting from immersion of the respective departing gas flow in vertical chambers is controlled by the fact that the depth of said chambers corresponds to the electrolyte height above the respective chamber. Disadvantageous here is the high cost of equipment which stands in the way of a technical implementation. The pressure in each individual gas chamber has in fact to be adjusted separately here, by means of valves.

A further method according to U.S. Pat. No. 4,578,159 provides that the catalyst for the oxygen reduction be applied directly to the cation-exchanging membrane. The hydroxide ions formed by oxygen reduction form with the alkali ions migrating with hydrate envelope through the membrane aqueous alkali-hydroxide solution, which runs off on the gas-side surface of a membrane coated hydrophilically with the catalyst and is collected. Disadvantageous in this case is the fact that the three-phase boundary layer lying towards the gas chamber can be destroyed by the aqueous alkali-hydroxide solution running off at the gas side, so that a higher operating voltage necessarily has to be used for the electrolysis.

The object of the invention is to provide an electrochemical half-cell which does not possess the disadvantages of the afore-mentioned apparatuses and in particular permits the use of a gas-diffusion electrode in a vertical arrangement of the cell, wherein the hydrostatic pressure of the electrolyte onto the electrode is compensated in a simple manner.

The object is achieved according to the invention by an electrochemical half-cell, consisting in at least one electrode chamber for accommodating an electrolyte, a gas chamber and at least one gas-diffusion electrode as anode or cathode separating gas chamber and electrode chamber, characterised in that the gas chamber is divided into two or more gas pockets superimposed on one another after the manner of a cascade, which are separate from one another and are open to the electrolyte in a downward direction, so that the pressure in each gas pocket across the opening to the electrolyte is in equilibrium with the pressure of the liquid column of the electrolyte in the corresponding part of the electrode chamber lying before the gas-diffusion electrode, and with which any gas supply or gas discharge takes place across the openings to the electrolyte.

The gas pockets are preferably each in hydrostatic equilibrium, above the electrolyte with the corresponding electrode chamber on the other side of the gas-diffusion electrode.

Preferably the gas pockets are bounded on their rear side by so-called gas baffles, which in turn end below the actual gas pocket in gas collecting hoods as openings to the electrolyte, wherein the gas collecting hoods serve to accommodate the gas bubbles rising in the electrolyte and the latter pass the electrode gas to the next highest gas pocket.

In particular the gas collecting hoods are arranged in the half-cell up to just before the rear wall of the electrochemical cell, e.g. in order to prevent a gas bubble by-pass, on the other hand however to achieve a hydrostatic pressure equalization in the rearward chamber filled with electrolyte.

The gas collecting hoods possess preferably gas passage openings, e.g. defined holes or slits, below the lower edge of the respective gas pockets or in the upper area of the gas collecting hood, which provide for a controlled delivery of excess gas to the next highest gas pocket. The distance of the gas passage openings from the lower edge of the respective gas pocket influences the differential pressure above the gaseous diffusion electrode.

The gas passage openings are preferably arranged offset laterally from one another from gas pocket to gas pocket, so that rising gas bubbles always impinge on hood areas without gas passage openings.

Particularly preferred are embodiments with groups of gas passage openings lying next to one another, above which, in the next highest hood, lie whole areas without gas passage openings. In extreme cases the respective hood can be arranged with passage holes on one side and without passage holes in the above-mentioned remaining area. The disposition of the areas with and without holes is then completely reversed for the next highest hood in each case.

Due to the physical separation of the function of "collection" and introduction into the gas pocket from the functions of delivery and transfer of the service gases to the next highest gas pocket, a convection is established in the gas area of the gas pocket, which helps to prevent an accumulation of non-convertible gas portions in the gas pocket. A gusset between hood and gas baffle can serve to reinforce the separation of introduction and delivery, in order to compel the gas convection in the gas pockets.

For the additional compensation of the pressure loss in the flowed-through electrolyte gap the above-mentioned holes or slits can also be accommodated other than at the same height relative to the gas pocket lying above them. They can instead (for the additional compensation of the hydraulic pressure loss in the narrow electrode chamber optionally filled with a spacer) be located at the deepest point in the bottommost hood and be staggered correspondingly higher in the hoods of the next highest gas pockets, in such a way that the same differential pressure conditions are always obtained in the respective gas chamber.

An additional compensation of the pressure loss becomes possible in particular through the fact that the diameter of the gas passage openings is varied from gas pocket to gas pocket in such a way that the diameter of the openings, assuming in each case identical relative height in the gas collecting hood, decreases or increases, preferably decreases, from bottom to top.

The gas collecting hood of the bottommost gas pocket is in particular constructed as a siphon (e.g. a converted sheet-metal strip), which makes it possible for the pressure compensation to be carried out undisturbed by electrolyte flowing into the half-cell and hence also undisturbed by the main flow between gas-diffusion electrode and ion exchange membrane.

A preferred variant of the half-cell according to the invention is characterised in that the introduction of gas from the gas collecting hoods into the gas pockets takes place through narrow slits, which are optionally interrupted by metallically conducting connections in order to improve the low-resistance power connection between support of the gas pocket and rearward power supply.

The slits are preferably so disposed that electrolyte spray from the gas bubbles bursting at the gas meniscus below the gas collecting hood cannot pass directly onto the rear side of the gas-diffusion electrode. The electrode rear side is optionally covered with a screen against the introduction of gas in order to prevent contamination of the electrode in the gas chamber.

The height of the respective gas pocket is preferably from 1 to 50 cm, in particular preferably from 5 to 30 cm.

The half-cell is preferably fed with electrode gas via a single gas supply into the bottommost gas pocket, wherein the respective surplus gas is in so doing passed from gas pocket to gas pocket from bottom to top and the surplus gas remaining behind the last gas pocket is carried away outward at the head of the cell.

The electrode gas can in a variant of the cell be fed into the bottommost gas pocket coaxially via a common nozzle with the electrolyte feed into the electrode chamber, while excess gas is being drawn off together with the electrolyte.

If several electrode segments are used as a gas-diffusion electrode, the mounting of the gas-diffusion electrode segments takes place gas-tight with respect to the electrode chamber.

The holding elements for the gas-diffusion elements can be constructed e.g. as clamping strips or magnetic strips, which serve initially as assembly aids.

In the case of electrolysis cells with intermediate ion exchange membrane the holding elements can after assembly be supported by means of the ion exchange membrane on the counter-electrode structure supported behind the latter and thus ensure a suitable contact pressure against the gas- diffusion electrode.

In the case of an electrolysis cell the holding elements can bear on their side facing the ion exchange membrane notches lying in the flow direction, which even with the cells in a tensioned state permit a homogeneous electrolyte passage from compartment to compartment of the electrode chamber.

In a particularly preferred embodiment the narrow electrode chamber is filled with an elastic spacer, which not only fulfils the spacer and turbulence promoter function, but can be placed across the above-mentioned holding elements, is tensioned together with the latter and thereby represents a further elastic component for the contact pressure and sealing of the gas-diffusion electrodes.

In a preferred variant of the half-cell according to the invention the mounting of the gas-diffusion electrode segments takes place with the aid of a T-shaped holding strip whose long member ends in straps of suitable lengths which are inserted by the low-resistance power-supply leads in such a way that a rearward tightening, e.g. via clamping wedges which are driven by means of suitably arranged bores, can take place. Gas-diffusion electrode and optionally seal are pressed onto the low-resistance power-supply leads via the short members of the T-shaped holding strip in such a way that both gas-tightness and good electrical contact are guaranteed.

The power supply to the gas-diffusion electrode takes place preferably via the holding apparatus of the latter, which in turn is connected at low resistance with the rear side of the cell to the external power source, wherein between the holding devices a metallic grid structure, to which the gas-diffusion electrode is connected on the electrolyte side, ensures short current paths. In the case of a gas-diffusion electrode with integral metallic grid the separate metallic grid structure between the holding devices can optionally be dispensed with.

In particular the low-resistance connection to the rear side of the cell is provided with openings or holes which permit on the one hand a hydrostatic pressure equalization of the electrolyte in the rear chamber and on the other a passage for the transferred gas bubbles.

The bottommost low-resistance connection to the rear side of the cell contains in particular a small equalization bore which permits electrolyte intermixing in the rear chamber, without affecting significantly a deliberate main flow of the electrolyte through the electrode chamber.

An advantageous embodiment of the half-cell according to the invention is characterised in that the whole structure of the gas pocket electrode is shaped so as to be removable from the electrolysis half-cell.

In particular it is preferable that the gas-diffusion electrodes can be exchanged, while all the remaining structures of the gas pocket electrode can continue to be operated.

A preferred form of the half-cell according to the invention serves as an oxygen-consuming cathode, e.g. in chlorine-alkali electrolysis. The oxygen required is supplied in horizontal gas pockets the respective height of which is determined by the differential pressure loadability of the gas-diffusion electrode. The gas pockets are in this case formed of the electrode, a rear-side baffle with suitable gas passage bores and gas bubble collecting hoods, together with a reverse-side holding structure for the gas-diffusion electrode, which can also perform the power distribution function. The oxygen is fed into the bottommost gas pocket. Oxygen not convened here bubbles via suitable bores in the bottom area of the rear-side baffle into the electrolyte fluid contained there, preferably the same electrolyte as in the cathode chamber, is absorbed by the gas bubble collecting hood of the next highest gas pocket and also fills the latter. This process is repeated up to the topmost gas pocket, wherein parts of the oxygen are consumed in each oxygen-consuming cathode. The feeding of the bottommost gas pocket is adjusted so that the topmost gas pocket still always gives off an excess of oxygen, so that it is ensured that all the oxygen-consuming cathodes are supplied to excess with oxygen. Unconverted oxygen can be collected and fed downward once more.

In the area of each gas pocket a gas pressure is obtained which corresponds to the liquid column from the bottom edge of the bubble meniscus to the top edge of the liquid column between gas pocket cascade and rear wall of the electrolysis cell. This pressure is compensated by the liquid column in the electrode chamber, wherein the equilibrium, assuming identical filling level in both chambers (e.g. with hydraulic connection of both chambers), lies at the bottom edge of the aforementioned bubble meniscus. Since homogeneous pressure reigns in the respective gas pocket, a slight excess pressure exists on average on the gas side, something which is also desirable for the purpose of optimal functioning, e.g. of the catalytic oxygen reduction.

If in a further preferred variant of the half-cell according to the invention the electrode chamber and the rear electrolyte chamber are separated hydraulically, the respective differential pressure, which is identical for all the chambers, can be set at will in both chambers by means of varying filling level or discharge height.

Thus it is possible, e.g. by separate gas discharge via a pipe carried away overhead to the gas offtake and an optionally provided electrolyte receiver lying above the latter, to set a controllable excess pressure which is then of the same amount compared with the electrode chamber for all the gas pockets.

Figure 5:
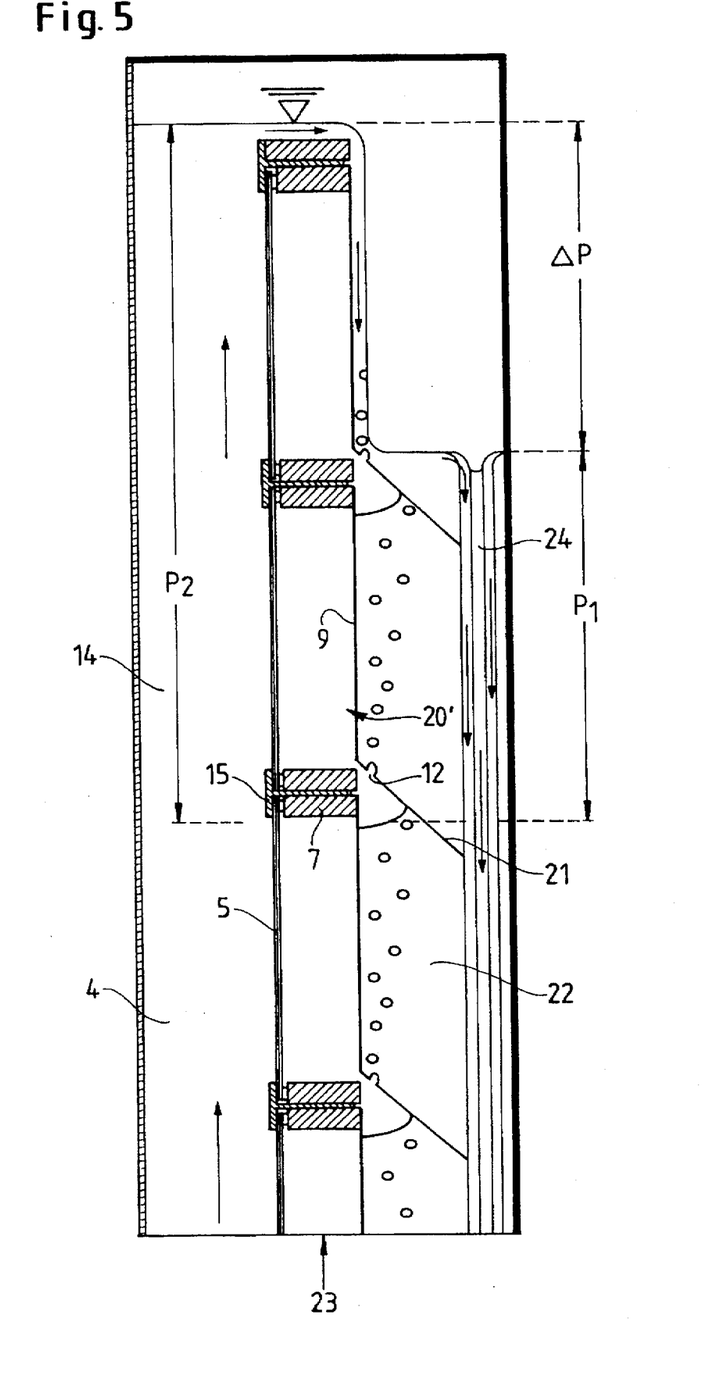

If on the other hand the electrolyte discharge from the cell is preferably carried away downward via a standpipe, as shown e.g. in FIG. 5, or else optionally to a side wall of the cell, it is directly possible to drain electrolyte and excess gas jointly by allowing the electrolyte from the electrode chamber to flow exclusively at the top via the gas pocket electrode into the rear electrolyte chamber, from where it escapes from the cell downwards via the standpipe together with the excess oxygen or, in the event of lateral discharge, also to the side. Different heights of the standpipe lead to different differential pressures, wherein the liquid pressure is in that case higher than the gas pressure, which is of particular advantage for the flush supporting of cloth-type gas-diffusion electrodes on the current distribution grid. Holding and clamping devices can then optionally be dispensed with for the electrode. In a quite similar way to the joint discharge of electrolyte and excess gas via the standpipe this can also take place laterally via a discharge pipe fixed laterally to the half-cell, wherein the separation of gas and electrolyte takes place e.g. in a collector next to the cell. The liquid pressure can in this way also be set higher than the gas pressure above the gas-diffusion electrode.

The half-cell according to the invention can be expanded to any technically feasible sizes by means of a corresponding number of gas pockets. Since the required gas amount (e.g. oxygen) for representative electrolysis charges is for example 0.7 to 1 standard cubic meter per square meter of cathode area per hour, the necessary gas transport can be obtained without any problem by suitable distribution of the bubble openings, as hydraulic tests have shown.

It is possible in principle with the half-cell according to the invention for the conventional commercial membrane electrolyzers for the electrolysis of alkali-halide solutions, provided they possess a sufficiently deep cathode chamber, to be converted to energy-saving operation with e.g. oxygen-consuming cathodes.

Other potential fields of application for the half cell according to the invention are for example Sodium-dichromate electrolysis. Here a hydrogen-consuming anode is possible instead of the oxygen-producing one; hydrogen production at the cathode can be replaced by oxygen reduction at an oxygen-consuming cathode.

Hydrogen peroxide production via oxygen reduction on a gas-diffusion electrode.

Alkaline fuel cells, as described in the preamble, are used for sodium hydroxide solution enrichment. Half-cells according to the invention can here be used as an anode for hydrogen conversion and as a cathode with oxygen reduction.

The half-cell according to the invention can in principle be used wherever a gas-diffusion electrode is operated in direct contact with liquid electrolytes.

All types of gas-diffusion electrodes known in principle can be used for the half-cell according to the invention, e.g.

types with integral metallic support or power distribution grid or electrodes constructed on carbon mats. Other preferred embodiments of the half-cell according to the invention are given in the subclaims.

The invention will be described in exemplifying detail below by means of the figures. In the figures

Figure 1:
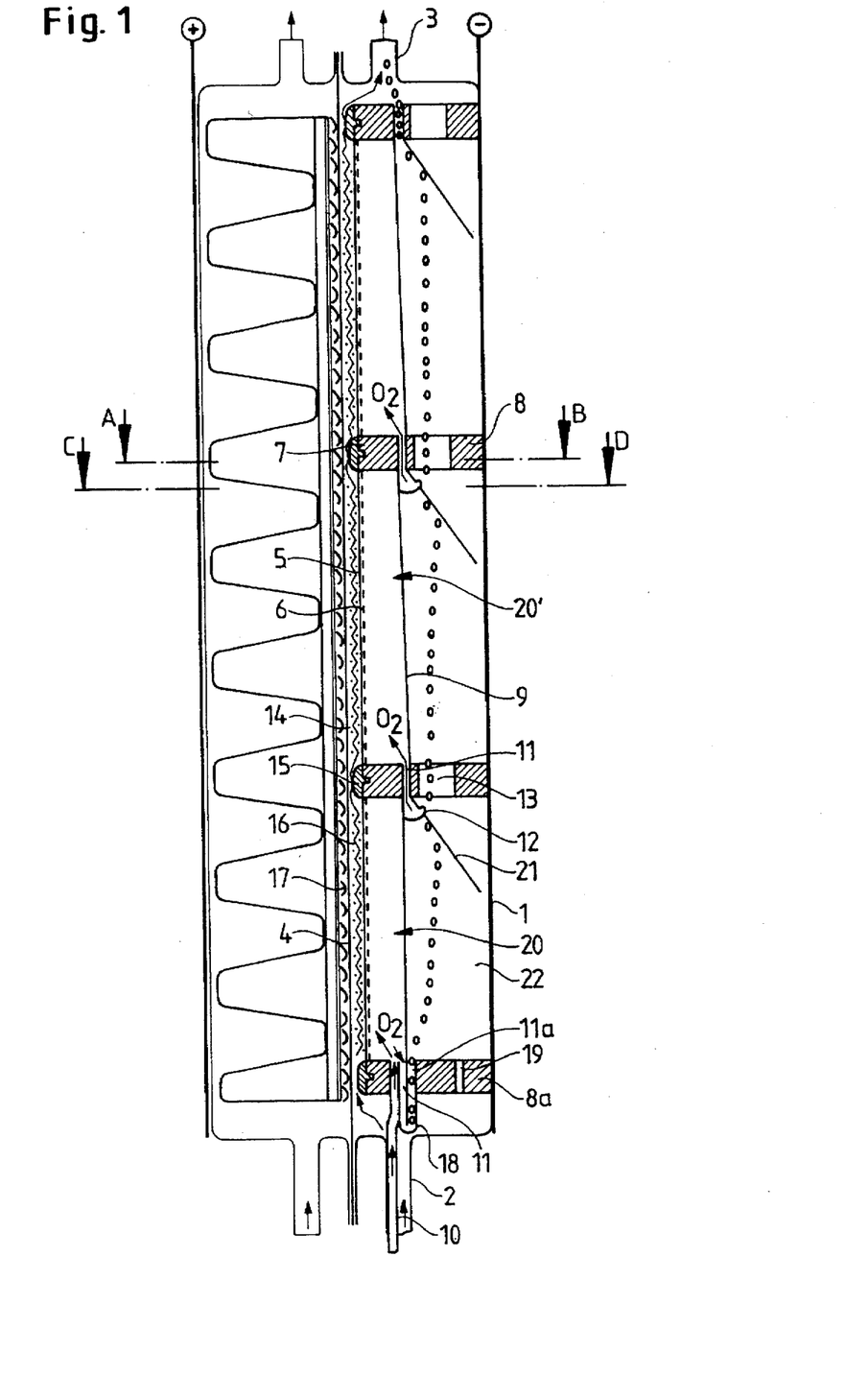
FIG. 1 shows the main layout of a half-cell connected here as an oxygen-consuming cathode, as part of a chlorine-alkali electrolyzer, FIG. 2 a diagrammatic section through the electrolyzer according to line A-B in FIG. 1, FIG. 3 a diagrammatic section through the electrolyzer according to the line C-D in FIG. 2, FIG. 4 a diagram of a basic arrangement of the gas pockets for a half-cell according to the invention and FIG. 5 a diagram of a half-cell with adjustable differential pressure.

In the half-cell 1 with an electrolyte inlet nozzle 2 and the electrolyte outlet nozzle 3, which is bounded by a conventional ion-exchange membrane, there is fitted instead of the conventional metallic electrode the gas-diffusion electrode 5. The gas-diffusion electrode obtains its power supply through a rearward metallic grid structure 6, which is responsible for a low-resistance power distribution into the gas-diffusion electrode and which experiences its power supply through the structural elements 7, which are in turn in metallic contact with the rearward connection elements 8, which are in connection via the rear wall 1 with the external power distribution (not shown here). The grid structure 6 can be dispensed with in the case of gas-diffusion electrodes 5 with integral metallic power distribution grid.

The actual gas pockets 20 are formed of the gas-diffusion electrode 5 with its hydrophobic rear side, the structural elements 7, which bound the pocket 20 not only at the top and bottom but also laterally, and the rear gas baffles 9, which are connected at the top and laterally gas-tight, e.g. welded, to the structural elements 7. The gas-tight connection extends to the lower end of the lateral gusset between gas baffle 9 curved towards the gas hood 21 and lateral structural element (not shown here).

The gas pocket electrode so formed can be shaped so as to be removable as a unit.

The gas supply can take place via a flexible tube 10 which is attached gas-tight to the bottommost gas pocket 20 and run coaxially through the inlet nozzle 2. The gas not converted in the bottommost gas pocket 20 flows through the gas passage opening 11, which is shaped identically for all the gas pocket elements, and bubbles through bores 12 in the angled hoods 21 of the gas baffles 9 or optionally a siphon 18 into the vertical liquid column, passes through the bores or openings 13 in the rear connection elements 8 and is absorbed by the hood 21 of the next highest gas baffle 9 and passed into the associated gas pocket 20', where part of the gas is once again converted. Gas not fully converted on the electrode 5 is drawn off through the outlet nozzle 3 jointly with the electrolyte 22 flowing away out of the electrolyte chamber, is optionally separated and used again as service gas.

In a variant (see FIG. 4) the gas not fully converted is discharged downwards through a standpipe 24 jointly with the electrolyte, wherein the differential pressure can be varied equally across all the gas-diffusion electrodes 5 through the height of the standpipe.

Figure 2:
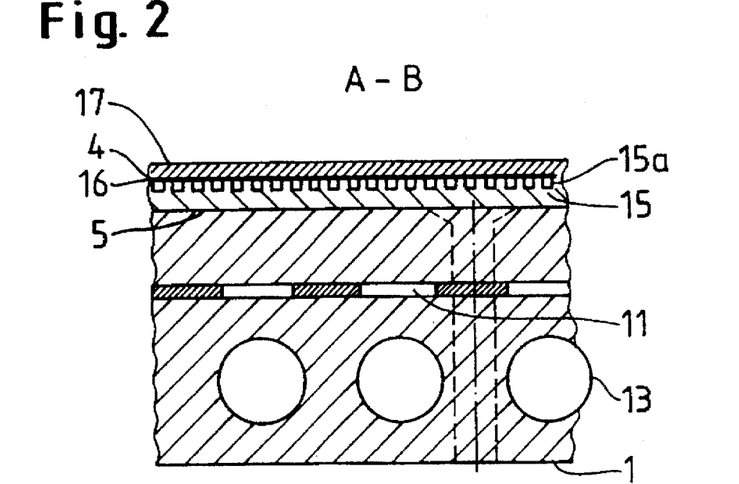
Figure 3:
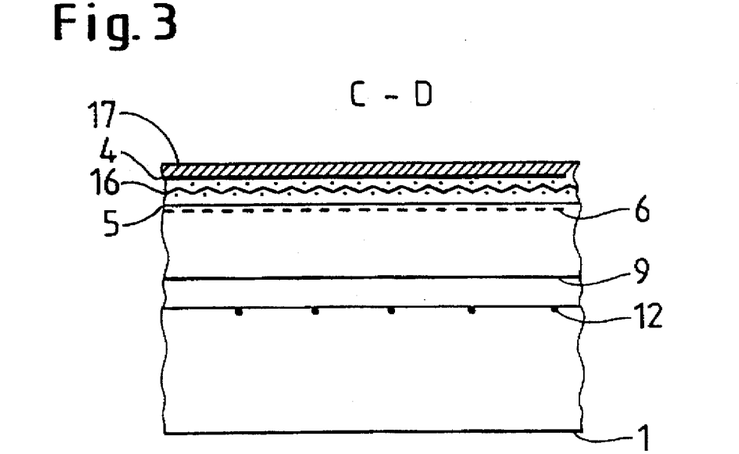

The securing and sealing of the gas-diffusion electrode 5 takes place on the structural elements 7 by means of clamping strips 15 (see also FIG. 2), which serve initially only as mounting aids. They can therefore also be constructed as magnetic strips with corresponding plastics coating, wherein the side of the pressure element pointing towards the ion exchange membrane 4 is provided with notches 15a obliquely to the strip, which are intended to permit an easy electrolyte flow from chamber to chamber of the cathode chamber 14.

A distance piece 16 of elastic electrolyte-resistant preferably non-conductive flimsy material covers the whole of the cathode chamber; it serves as a turbulence promoter and spacer and leads to a flush supporting of the gas-diffusion electrode 15 on the current distribution grid 6. There serves as areal abutment the electrode 17 lying on the other side of the membrane 4, which in the case of an alkali-halide electrolysis rests on the membrane 4 as anode 17 and after assembly of the cell not only takes over this mechanical function, but in particular also presses the clamping or magnetic strips 15 with suitable pressure through the compressed distance piece 16 onto the gas-diffusion electrode 5 and helps seal the latter. In this way the flapping of membrane and gas-diffusion electrode is reliably prevented, thus increasing their service life. In addition a low-resistance flush current contact between gas-diffusion electrode 5 and power distribution grid 6 is thereby achieved.

Since in the area of the electrolyte feed 2 at the bottom it is intended to reliably prevent e.g. oxygen as electrode gas getting into the cathode gap, the bubble overflow is varied here in particular as follows:

Gap 11 for the gas overflow is formed as on the other gas pockets 20. The gas baffle 9 operating here is however curved into a siphon 18 and led back through the rear connection element 8a, which does not possess any openings 13, wherein the immersion is carried out by the gas baffle 9 of the relevant bottommost gas pocket 20, which gas baffle 20 is not curved towards the hood. There is formed behind the gas baffle 9 similarly to the gap 11 a gap 11a, which allows the overflowing gas to pass. With this measure a corresponding excess pressure is also ensured for the bottommost gas pocket 20. A small equalization bore 19 in the rear connection element 8a ensures a minimal electrolyte exchange in the rear chamber, without-the forced flow through the cathode chamber 14 being significantly disturbed.

EXAMPLE 1

In an exemplifying embodiment for simulating the hydraulics of the gas pocket electrode a model test was run with the following parameters:

A model (according to FIG. 4) was constructed with the following dimensions but without electrical components.
model height 30 cm,
model width 20 cm,
3 gas pockets each 10 cm high,
chamber depth 1 cm,
hood length 6 cm,
hood angle approx. 30°,
two bores each 0.5 mm in the hood bend,
10 cm distance from bore to bore.

Figure 4:
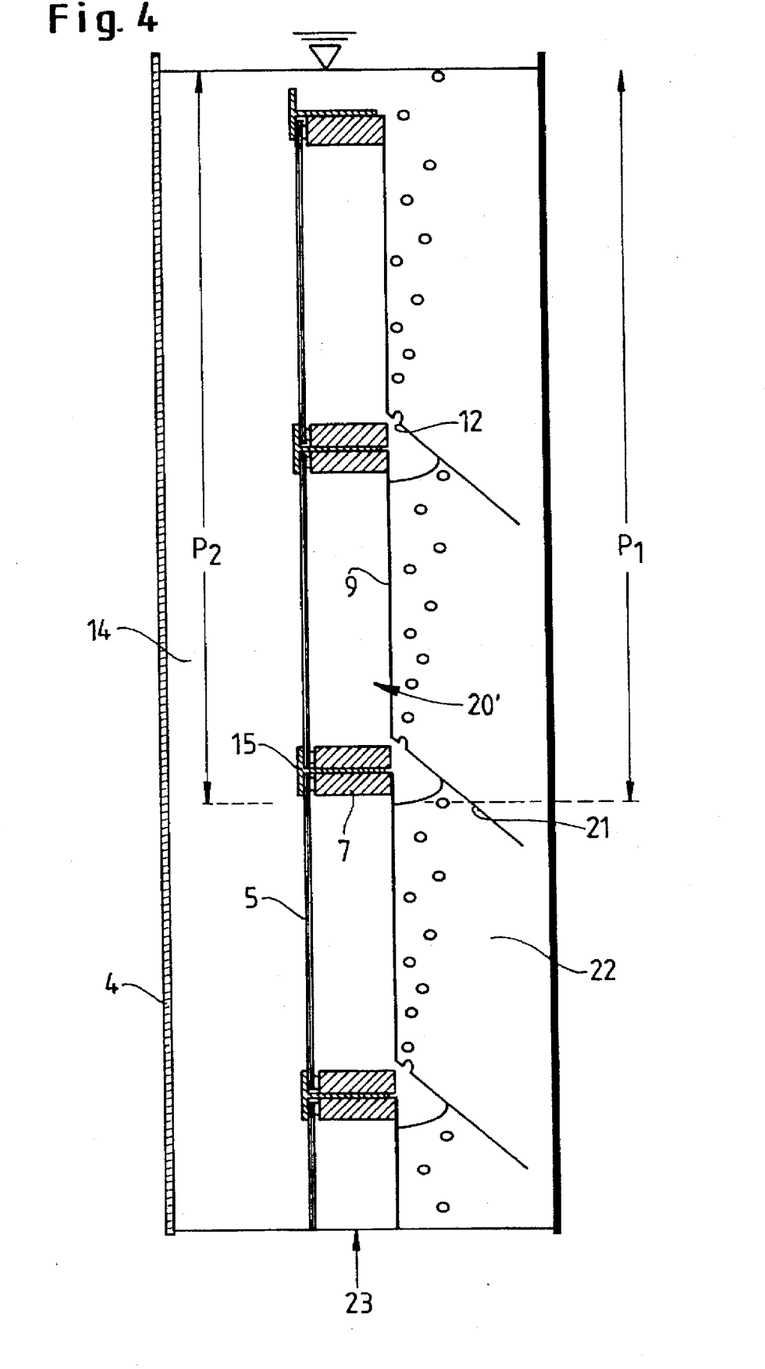

The bores were offset laterally from one another from gas hood 21 to gas hood 21'.

RESULTS

The tests were run with compressed air and oxygen. With the selected arrangement up to 30 to 35 l/h of gas were able to be passed through per bore before the first gas bubbles bubbled across the hood edge of the free-standing gas pockets. Differential pressure tests produced the same differential pressures for all three chambers. The required amount of oxygen per square meter of electrode area for a specific load of 3 kA/m² comes to e.g. 0.63 $m_N^3/m^2 \times h$ or at 75° C. operating temperature approx. 0.8 $m^3/m^2 \times h$ ($m_N^3$= standard cubic meter).

For the passage rate measured on the model of 30 l/h per bore and assuming that the electrolyte cell is 1 m high and 4 gas pockets each 25 cm high are sufficient, one can make do, assuming otherwise equal dimensions, with one bore about every 7 cm, since at the exit from the bottommost gas pocket 0.2 m³/h of the service oxygen has already been consumed on the bottommost electrode and the load on the overflow of the next highest gas pocket is likewise reduced by the 0.2 m³/h of oxygen consumed there.

EXAMPLE 2

Practical example of the pressure-compensated operation of an oxygen-consuming cathode:

In an additional practical example an electrochemical cell of the following dimensions was constructed and operated:

| | |
|---|---|
| cell height | 90 cm |
| cell width | 22 cm |
| 4 gas pockets each | 18 × 18 cm² |
| chamber depth | 1.5 cm |
| hood length | 6 cm |
| hood angle approx. 10° two bores per hood, | each 1.5 mm at a spacing of 4 cm, changing sides from hood to hood |
| oxygen-consuming cathode | 4 free active surfaces each 18 × 18 cm², type ESNS, manufactured by GDB, Frankfurt, containing 20% Pt on C; 15.7 g Pt/m² |
| membrane | Nafion ® 980 WX, manufactured by DuPont |
| gap between cathode and membrane | 0.3 cm |
| anodes | titanium expanded metal with low-oxygen activation from Haereus, Hanau 4 anode segments 18 × 18 cm², separated electrically from each other |

Results: For a current density of 3 kA/m², a cell temperature of 85° C., a NaCl sole inflow concentration of 300 g/l, a sole decrease in concentration of about 90 g/l in the cell, a sodium hydroxide concentration of 32.5% and a supply of pure oxygen of an excess of about 10%, the following individual voltages were measured in the cell segments, from the top to the bottom:

| | |
|---|---|
| segment 1 | 2.04 V |
| segment 2 | 2.05 V |
| segment 3 | 2.04 V |
| segment 4 | 2.04 V |

Even after continuous operation for one week no dependency of the voltages on height could be detected. The deviations from the average value remained in the range of ≦5 mV; the noise of the voltage measurements was only extremely low.

We claim:

1. Electrochemical half-cell (1), comprising at least one electrode chamber (14) for accommodating an electrolyte (22), a rear electrolyte chamber for accommodating a column of electrolyte (22), a gas chamber (23) between said electrode chamber (14) and said rear electrolyte chamber, at least one gas diffusion electrode (5) as anode or cathode separating said electrode chamber from said gas chamber, a gas tight baffle (9) separating said rear chamber from said gas chamber and forming one wall of said rear chamber, said rear chamber having a rear wall opposite said gas-tight baffle, said rear chamber being defined by the space between said gas-tight baffle and said rear wall, said gas chamber being divided into two or more individual gas pockets (20, 20') arranged one on top of another as a cascade, each of which has an opening (11) at the bottom communicating with the rear chamber through baffle (9) and through which gas can flow, wherein the hydrostatic pressure of the electrolyte (22) liquid column against the surface of the gas diffusion electrode (5) directed to the electrode chamber (14) of each gas pocket (20, 20') is balanced by the pressure in the gas pocket (20, 20'), which gas pressure is approximately equal to the hydrostatic pressure of the electrolyte liquid column in the rear chamber weighing on the gas in each gas pocket via the opening (11) of that pocket.

2. Electrochemical half-cell according to claim 1, further comprising gas collecting means to supply the gas pockets (20, 20') via openings (11).

3. Electrochemical half-cell according to claim 2, wherein said gas collecting means are gas collecting hoods.

4. Electrochemical half-cell according to claim 3, wherein said gas collecting hoods have openings (12) to discharge surplus gas.

5. Electrochemical half-cell according to claim 4, wherein said openings (12) are at elevations that are lower than the elevations of the corresponding openings (11).

6. Electrochemical half-cell according to claim 4, wherein said openings (12) are arranged as One or more discrete groups, and the discrete groups in each hood are laterally offset from the discrete groups of openings in the hoods immediately above and immediately below.

7. Electrochemical half-cell according to claim 6, wherein the discrete groups of openings are separated from each other by gussets.

8. Electrochemical half-cell according to claim 3, wherein said gas collecting hoods extend from the upper side of opening (11) in gas baffle (9) and extend therefrom at a downward angle in the direction of said rear wall.

9. Electrochemical half-cell according to claim 8, wherein the extension of said gas collecting hoods are in contact with or is spaced apart from said rear wall.

10. Electrochemical half-cell of claim 3, wherein the gas collecting hoods supplying each individual gas pocket (20, 20') are offset laterally from the gas collecting hoods supplying the other individual gas pockets.

11. Electrochemical half-cell according to claim 3, wherein the bottommost gas pocket (20) is provided, at the bottom thereof, with a gas collecting hood having a siphon extending into said gas pocket, thereby enabling the pressure in said gas pocket to be balanced against the hydrostatic head of liquid in chamber while at the same time preventing electrolyte rear chamber from entering the gas pocket.

12. Electrochemical half-cell according to claim 1, wherein the height of each gas pocket (20, 20') is from 1 to 50 cm.

13. Electrochemical half-cell according to claim 12, herein said height is from 5 to 30 cm.

14. Electrochemical half-cell according to claim 1, further comprising a coaxial nozzle (2) at the bottom of said half-cell through which electrolyte (22) can be supplied to electrode chamber (14) and the rear cheer, and gas can be supplied to the gas chamber at the same time.

15. Electrochemical half-cell according to claim 1, wherein said electrode chamber (14) and said rear chamber are joined at the top of the half-cell.

16. Electrochemical half-cell of claim 15, wherein said joined electrode chamber and rear chamber is equipped with a gas vent (3).

17. Electrochemical half-cell according to claim 1, further comprising internal standpipes in the rear chamber for discharging gas and electrolyte (22) from the cell.

18. Electrochemical half-cell according to claim 17, wherein the heights of said standpipes are individually adjustable.

19. Electrochemical half-cell according to claim 1, wherein said electrode chamber and said rear chamber are hydraulically interconnected.

20. Electrochemical half-cell according to claim 1, wherein said electrode chamber and said rear chamber are hydraulically isolated from each other.

21. Electrochemical half-cell according to claim 1, wherein said gas diffusion electrode is held in place by support elements (7), and further comprising an electrically conductive grid, said grid being in contact with said gas diffusion electrode, and is also held in place by said support elements (7), said support elements (7) including electrical conductors through which electricity can be conducted from an electrical power source to said grid.

* * * * *

UNITED STATES PATENT AND TRADEMARK OFFICE
CERTIFICATE OF CORRECTION

PATENT NO. : 5,693,202

DATED : December 2, 1997

INVENTOR(S) : Gestermann, et al.

It is certified that error appears in the above-identified patent and that said Letters Patent is hereby corrected as shown below:

Col. 10, lines 50-51    After " liquid in " insert -- the rear --, and after " electrolyte " insert -- (22) in the --

Signed and Sealed this

Eighth Day of September, 1998

Attest:

BRUCE LEHMAN

Attesting Officer    Commissioner of Patents and Trademarks